United States Patent [19]

Evers

[11] Patent Number: 5,296,282

[45] Date of Patent: Mar. 22, 1994

[54] DEGRADABLE REPELLANT COATED ARTICLES

[75] Inventor: Glenn R. Evers, Wilmington, Del.

[73] Assignee: E. I. Du Pont de Nemours and Company, Wilmington, Del.

[21] Appl. No.: 743,850

[22] Filed: Aug. 12, 1991

[51] Int. Cl.$^5$ .......................... D06N 7/04; B32B 7/14; B32B 27/00; A01G 23/02

[52] U.S. Cl. .................... 428/195; 428/147; 428/201; 428/206; 428/211; 428/422; 428/537.5; 220/DIG. 30

[58] Field of Search .............. 428/147, 195, 201, 206, 428/211, 422, 537.5; 47/74; 427/393.4; 220/DIG. 30

[56] References Cited

U.S. PATENT DOCUMENTS

| | | | |
|---|---|---|---|
| 3,705,659 | 12/1972 | Mackie | 47/74 |
| 3,923,715 | 12/1975 | Dettre et al. | 260/29.6 |
| 3,944,688 | 3/1976 | Inman | 428/921 |
| 4,115,605 | 9/1978 | Hultman | 427/393.4 |
| 4,471,077 | 9/1984 | Lange | 521/64 |
| 4,719,246 | 1/1988 | Murdoch et al. | 521/134 |
| 4,742,140 | 5/1988 | Greenwood et al. | 526/245 |
| 4,997,697 | 3/1991 | Malhotra | 428/195 |
| 5,059,580 | 10/1991 | Shibata et al. | 428/195 |
| 5,196,247 | 3/1993 | Wu et al. | 428/913 |

OTHER PUBLICATIONS

Matijevic, E. & Eirich, F., "Wettability & Contact Angle", Surface & Colloid Sci. vol. 2., Interscience, NY, NY (1969) pp. 85 et seq.

Fox, H. W. & Zisman, W. A., "The Spreading of Liquids on Low Energy Surfaces. I. Polytetrafluoroethylene", J. Colloidal Sciences, pp. 515-531.

Ellison, A. H., & Zisman, W. A., "Wettability Studies of Nylon, Polyethylene, Terephthalate and Polystyrene", J. of Physical Chem. (1954) 58 pp. 503-506.

Johnson, R. E. & Dettre, R. H., "The Structure and Wettability of Polymeric and Monolayer Surfaces", Am. Chem. Soc., Polym. Chem. Div. vol. 28 pp. 48-49 (1984).

Fox, H. W. & Zisman, W. A., "The Spreading of Liquids on Low Energy Surfaces, III. Hydrocarbon Surfaces", J. Colloid Sci., pp. 428-442 (1952).

Baxter, S. & Cassie, A. B. D., J. Tex. Inst. 36, T 67 (1945).

Primary Examiner—George F. Lesmes
Assistant Examiner—Kathryne Elaine Shelborne

[57] ABSTRACT

Shaped articles having a substrate of a degradable synthetic polymeric material and a discontinuous liquid repellant hydrophobic and/or oleophobic surface layer.

19 Claims, 2 Drawing Sheets

DEGRADABLE REPELLANT COATED ARTICLES

BACKGROUND OF THE INVENTION

This invention relates to articles fabricated from synthetic degradable polymeric materials comprising a substrate containing a degradable polymer, at least one surface of which is coated with a discontinuous layer of a repellant material.

Until recently, most polylactide processes have produced polymers that were very expensive. Because of the high price of these polylactic acid (PLA) polymers, their uses have been limited to very high value uses. Consequently, despite the recognized valuable properties of polylactic acid polymers their usage remains limited.

SUMMARY OF THE INVENTION

The present invention relates to shaped articles, particularly in film form, fabricated from synthetic polymeric materials that are degradable by hydrophilic and/or oleophilic liquids, wherein these articles are protected against premature degradation by these liquids. This protection is achieved by incorporating on the surface of the article to be protected a discontinuous surface layer of a hydrophobic and/or oleophobic material that will repel the assaulting or degrading liquids (i.e., hydrophilic and/or oleophilic liquids). The repellant surface is sufficiently discontinuous, normally in the form of a layer of discrete particles, so that degrading gas, vapors and bacteria can penetrate the repellant surface, thereby gaining access to the degradable substrate and initiating degradation of the substrate. However, because of the composition and physical nature (e.g., surface tension), of the repellant surface, the assaulting liquid cannot contact and degrade the substrate. Therefore, the shaped articles of the invention may be used as a container for an assaulting liquid and yet degrade eventually into environmentally benign products.

DETAILED DESCRIPTION OF THE INVENTION

Figure 1:
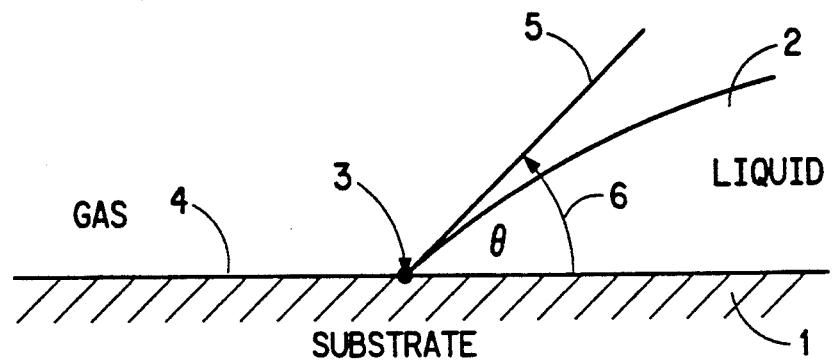
FIG. 1 is an illustration of an advancing contact angle which may be formed with the repellant layer.

The invention relates to a shaped article characterized by:

a. a substrate comprising a degradable, or partially degradable, synthetic polymeric material that degrades via hydrolysis and/or biodegradability; and b. one or more surfaces of the substrate which are coated with a discontinuous repellant hydrophobic and/or oleophobic material.

The term "degradable" defines that at least the substrate of the article is able to breakdown under typical environmental and/or composting waste treatment conditions (e.g., via hydrolysis and/or biodegradability) to gas and/or aqueous products in concentrations generally harmless to the environment. The term "biodegradable" defines a process whereby bacteria, fungi, yeasts, etc., and their enzymes consume the substrate of the article as a food source so that its original form substantially disappears. Under the appropriate conditions such as moisture, temperature, oxygen availability, etc., substantially complete biodegradation typically occurs in about 2–3 years. Generally, the biodegradable polymeric substrate of the invention degrades within about 1 year in a manner sufficient to permit the degradable substrate to be converted into soil-improving materials (e.g., mulch). Substantially harmless inert particles (e.g., a repellant material), that do not "degrade", as defined above, can be present in the "degradable" articles of this invention. However, the degradable polymeric substrate must degrade under recycle, environmental and/or composite waste disposal conditions. Thus, the substrate of the present articles must be degradable by:

1) aqueous exposure (hydrolysis);
2) biodegradable, with or without prior treatment, under environmental or waste disposal conditions, and/or;
3) chemically degradable via simple environment/compost waste treatment conditions or by recycle chemical treatment.

The synthetic polymeric degradable substrate, that is to be protected from premature degradation, may comprise one or more degradable polymers, particularly polyvinylalcohol, polyalkylenehydroxy acids such as polybutylenehydroxy acids, and/or a polyhydroxy acid (PHA). A suitable PHA comprises at least one hydroxy unit selected from the following group:

(i) (OCR'R'COOCR'R"CO)q
(ii) [O(CR'R")$_n$CO]p
(iii) (OCR'R"CR'R"OCR'R"CO)r
(iv) (OCR'R"CR'R"ZCR'R"CR'R"CO)s
(v) copolymers of (i)–(iv) with non-hydroxy acid comonomers wherein n is 2, 4 or 5;
p, q, r and s are integers, the total of which may range from about 350 to 5,000; R' and R" comprise hydrogen, hydrocarbyl containing 1 to 12 carbon atoms, or substituted hydrocarbyl containing 1 to 12 carbon atoms; and Z is O, S, NH or PH. The values of p, q, r and s may selected to impart various degrees of crystallinity and crystallization rates appropriate for oriented (e.g., biaxially), film production.

Examples of suitable non-hydroxy acid co-monomers comprise those capable of condensation polymerization with lactide or lactic acid, e.g., lactones such as epsilon-caprolactone; beta-propiolactone; alpha, alpha-dimethyl-betapropiolactone; and dodecanolactone; lactams; other hydroxy acids such as glycolic acid; and amino acids.

A desirable PHA comprises polylactic acid, either as a homopolymer or as a copolymer containing over 50%, and normally over 70%, of lactide units. For certain articles, particularly for food containers, the "L" isomer of lactide is desirable since L-lactide is naturally present in the human body and in certain foods such as milk.

The repellant surface may comprise a layer coated onto one or more surfaces of the degradable articles of the present invention. The repellant may be applied as a surface layer by any technique that results in a discontinuous layer with adequate physical and/or chemical bonding to the surface of the degradable substrate material. The discontinuous repellant material coating or layer extends generally over the entire area of the article to be protected from degradation by the assaulting liquid. However, in some cases, it may be desirable to provide the discontinuous repellant layer onto only selected areas or portions of the substrate. The repellant surface must be discontinuous and normally the repellant material comprises discrete particles or a perforated layer or sheet. Alternatively, the repellant material can be in the form of a porous surface layer such as a woven or non-woven fabric material, a lattice, elongated particles, filaments, etc. Further, the repellant material may comprise coated particles and/or fibers (e.g., a fiber may be rendered repellant by being coated with a repellant material).

The repellant surface usually comprises a hydrophobic and/or oleophobic material that has an adequately low critical surface tension to repel the particular assaulting liquid to which the article will typically be exposed and sufficiently discontinuous to eventually permit the adjacent degradable substrate to be degraded. For purposes of this invention, a hydrophobic material comprises a material that will prevent wetting of the substrate by an aqueous assault liquid. An oleophobic material comprises a material which will prevent wetting of the substrate by an organic assault liquid substantially immiscible with water. The repellant surface discussed above may also comprise a material that is both hydrophobic and oleophobic which will prevent wetting of the substrate by both aqueous and organic assault liquids.

Hydrophobic repellant surface layers will generally repel water and aqueous solutions, such as aqueous acids and bases such as tea, juices, soft drinks, coffee, etc. Oleophobic repellant surface layers will repel oils and greases, which may be present in meats, poultry, hydrocarbons, etc. If the repellant surface layer is both hydrophobic and oleophobic, the surface layer will generally repel both aqueous and organic liquid materials. For example, many foods, such as meats and dairy products have both aqueous and organic liquid components. Therefore, the shaped articles of this invention may be used as a container for an assaulting liquid comprising a food product and yet degrade (e.g., after disposal) eventually into environmentally benign products.

In accordance with the invention, the repellant surface may comprise one or more of the following repellant materials: paraffin, waxes, fatty acids, bee's wax, silicones, fluorochemicals, alkylketene dimers, etc.

In one aspect of the invention, a suitable repellant surface material comprises an aqueous dispersion of a particulate perfluoroalkyl material (e.g., "Teflon" MF which is manufactured by E.I. du Pont de Nemours and Company). These perfluoroalkyl materials may be in combination with other non-fluorinated polymers, such as an aqueous dispersion of a nonfluorinated vinyl polymer and a perfluoroalkyl ester of a carboxylic acid (e.g., refer to the disclosure of Dettre et al. U.S. Pat. No. 3,923,715 which is hereby incorporated by reference) A suitable repellant material may also comprise interpolymers of a perfluoroalkylethylacrylate (e.g., "Zepel" 7040 which is manufactured by E.I. du Pont de Nemours and Company) and other non-fluorinated polymers (e.g., refer to the disclosure of Greenwood et al. U.S. Pat. No. 4,742,140 which is hereby incorporated by reference). Greenwood, U.S. Pat. No. 4,720,140, discloses oil and water-repellant solid fluoropolymers that comprise, by weight:

(a) 40–75% polymer chain units derived from a mixture of perfluoroalkylethylacrylate monomers of the formula:

$$CF_3CF_2(CF_2CF_2)_kC_2H_4OC(O)CH=CH_2,$$

the monomer mixture consisting essentially of:
(1) 0–10% monomer wherein k is less than 4;
(2) 45–75% monomer wherein k is 6;
(3) 20–40% monomer wherein k is 8;
(4) 1–20% monomer wherein k is 10; and
(5) 0–5% monomer wherein k is 12;

(b) 10–35% polymer chain units derived from an vinylidene chloride; and (c) 10–25% polymer chain units derived from an alkyl acrylate or an alkyl methacrylate having an alkyl chain length of 2–12 carbon atoms.

The surface tension of the repellant material is a key aspect of the invention. The repellant surface layer must have a surface tension from about 5 to 54 dynes per cm and, for best results, normally not above about 30 dynes/cm. The surface tension of the repellant material enables the repellant material to protect the substrate from assaulting liquids.

The advancing contact angle measured between the repellant surface layer and the assaulting liquid must be at least about 70° (refer to FIG. 1 which will be discussed below in greater detail). For further information on the advancing contact angle, see "Wettability and Contact Angle", Surface and Colloid Science, Vol. 2, E. Matijevic and F. Eirich, Ed., (Interscience, NY, N.Y. 1969), pg. 85; "The Spreading of Liquids on Low Energy Surfaces. I. Polytetrafluoroethylene", Fox and Zisman, p. 515–531, J. Collidal Sciences; and "Wettability Studies of Nylon, Polyethylene Terephthalate and Polystyrene", Ellison and Zisman, Journal of Physical Chemistry 58, p. 503–506 (1954). The disclosure of each of the above publications is hereby incorporated by reference.

The Matyevic et al., reference demonstrates a technique for calculating the advancing contact angle $\theta$ by using the formula:

$$\cos \theta = 1 + m(\gamma_{[l/v]} - \gamma_{[c]})$$

where
$m = -0.037$ cm/dynes
$\gamma_{[l/v]}$ = the surface tension of the assaulting liquid, dynes/cm.
$\gamma_{[c]}$ = the critical surface tension of the repellant surface layer, dynes/cm.

While an upper limit surface tension for the repellant surface layer of about 54 dynes/cm is suitable for aqueous liquids, in general oils cannot be repelled adequately with such high surface tension repellants (e.g., an advancing contact angle of at least 70° usually cannot be maintained between high surface tension repellants and an oil). Particularly, a repellant for an assaulting liquid comprising oil should have a maximum surface tension less than about 24 dynes/cm to maintain an advancing contact angle of at least about 70°. For example, water has a surface tension of 72 dynes/cm; a repellant surface of 13 dynes/cm will readily repel water. However, 13 dynes/cm is about the absolute maximum surface tension to repel a No. 1 oil having a surface tension determined by an $\gamma_{[l/v]}$ of about 31 dynes/cm. In other words, for an oil assaulting liquid having a $\gamma_{[l/v]}$ of about 31 dynes/cm to have $\theta$ in the above formula of at least 70°, the $\gamma_{[c]}$ of the repellant material cannot exceed 13. For further information on oil repellency, see AATCC Test Method 118-1983 "An American Standard", "Oil Repellency: Hydrocarbon Resistance Test", AATCC Technical Manual.

For water repellance and protection from related aqueous assaulting fluids, many silicone materials have adequately low critical surface tensions for excellent repellency (e.g., water having an $\gamma_{[1/v]}$ of 72 dynes/cm, can readily be repelled by silicone or other hydrophobic materials with an $\gamma_{[c]}$ of below about 24). For example, a woven structure comprising individual 10 micron polyglycolic acid (PGA) filaments with an approximate maximum generally square pore opening of about 100 microns on a side may be coated with a repellant comprising an organopolysiloxane water emulsion solution. Usually, the organopolysiloxane water emulsion coating solution comprises about 93.4 weight percent water, about 5.5 weight percent Dow Corning 75 emulsion and about 1.1 weight percent Dow Corning 62 catalyst which comprises triethanolamine, zinc acetate and tetraisopropyltitanate. The emulsion coating solution may deposit approximately 1.0% silicone solids on the PGA filaments. The PGA woven filament structure may be dryed and cured at about 93° C. for about 20 minutes. The approximate open area in the structure is 8%. The coated structure may be placed upon an extruded approximately 1 mil thick extruded polylactide acid film, and heated at about 130° C. for about 15 seconds over a hot roller surface. The resultant article comprises a discontinuous silicone repellant layer coated onto a degradable polyglycolic acid filament substrate surface, which is bonded to a degradable polylactic acid base film. Water is normally completely repelled by the repellant layer thus protecting both the polyglycolic acid filament substrate layer and the polylactic acid base film.

The relationship between repellancy and surface tension in accordance with the invention may be better understood by reviewing FIG. 1. Now referring to FIG. 1, the advancing contact angle is shown wherein 1 is the repellant layer, 2 is the assaulting liquid, 3 is the point of intersection, 4 is the tangent of the surface of the repellant, 5 is the tangent of the assaulting liquid, and; 6 is the advancing contact angle $\theta$.

It is also essential that the surface layer of the repellant material have physical characteristics that prevent the meniscus of the attacking liquid from contacting the degradable substrate. For example, if the substrate is generally flat, the maximum size of individual openings or pores in the repellant material which are acceptable for protecting the substrate from being contacted by the assaulting liquid is a function of at least one of the following factors: 1) the pressure (e.g., hydrostatic head), of the assaulting liquid, 2) the critical surface tension of the assaulting liquid, 3) the effective diameter of the surface repellant material, and; 4) the critical surface tension of the surface repellant material. The temperature of the assaulting liquid should not be so great as to adversely affect the structural integrity of the article. These factors define the maximum size of the openings or pores in the repellant layer. A detailed discussion of a method for calculating the maximum size of the openings or pores can be found in S. Baxter and A.B.D. Cassie, J. Tex. Inst 36, T67 (1945), which is incorporated by reference.

Figure 2:
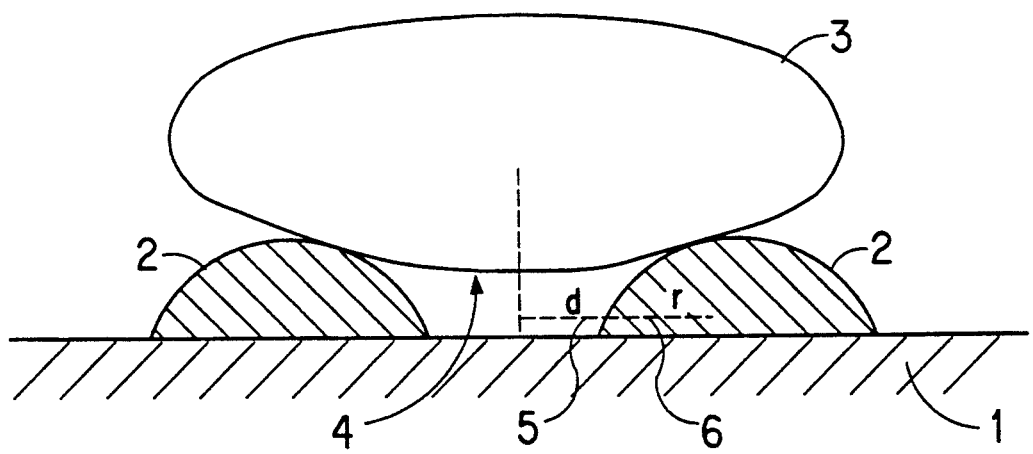
FIG. 2 is an illustration of the meniscus which may be formed with the repellant layer.

The relationship between repellancy and the meniscus in accordance with the invention may be better understood by reviewing FIG. 2. Now referring to FIG. 2, which demonstrates the relationship between the substrate and the meniscus of the assaulting liquid, wherein 1 is the substrate, 2 are the repellant particles, 3 is the assaulting liquid, 4 is the meniscus of the liquid, 5 and 6 are "d" and "r"("d" and "r" are also discussed in the Baxter, et al., publication).

The assaulting liquid and/or the meniscus thereof, must not come into direct contact with the uncoated or unprotected portions of the degradable substrate. If the degradable substrate has an irregular surface, any protrusions on the substrate must not extend through the adjacent repellant layer so as to come into contact with the assaulting liquid (e.g., a protrusion must not extend through an opening or pore of the repellant layer in a manner sufficient to be contacted by the assaulting liquid).

The characteristics of the repellant surface are coordinated to provide adequate protection to the degradable substrate from an assaulting liquid and yet be sufficiently discontinuous to permit the substrate to eventually degrade. For example, the composition, opening or pore size, etc., of the repellant material can be selected to obtain a repellant surface having characteristics which permit the substrate to be exposed to degrading vapors and bacteria and still achieve the desired contact angle and meniscus.

The percentage of the surface area of the substrate which is coated with the repellant can be controlled by varying the amount of repellant applied to a surface of the degradable substrate. Any suitable means or technique such as emulsion coating, spraying, sputtering, silk-screening, etc., may be used to control the manner in which the repellant material is applied. By using a suitable means, the percentage of the surface of the substrate may be controlled and, accordingly, the rate and ease of degradation may be manipulated. For reasonably rapid degradability of the product, the surface repellant layer should be significantly discontinuous, that is, the openings or pores in the surface area should be adequate to allow extensive penetration by gases and bacteria. For example, to degrade the substrate under composting conditions, normally at least about 15% of the substrate surface of degradable polymeric material is free of repellant so that the degrading water vapor, bacteria and/or other degradant initiators can adequately contact the substrate (i.e., not more than about 85% of the surface area of the substrate should be covered by repellant material).

In one aspect of the invention, a second repellant material may also be used (e.g. coated upon a first repellant material), which may be readily removed such as by a water rinse wherein more than about 85% of the surface might be covered temporarily. However, after removal of the second repellant material, desirably at least about 15% of the surface will be exposed to degradation initiating vapors and bacteria.

For many articles, larger areas of uncoated substrate, from about 5-20%, are acceptable and desirable to expedite degradation. For articles exposed to conditions wherein the hydrostatic head of the assaulting liquid is high, it may be necessary to have more than about 85% of the degradable surface coated with repellant. Under extreme conditions it might be necessary that up to about 95% of the substrate be covered by the repellant layer. Moreover, in some cases a plurality of repellant layers having similar or distinct characteristics may be desirable.

In another aspect of the invention, a surfactant selected to wet the repellant layer can be used to increase the rate of degradability of the present articles. For example, a degradable synthetic substrate of the invention may be coated with a fluorochemical repellant wherein the repellant can be wetted by using a fluorosurfactant such as "Zonyl" FSO. The surfactant tends to reduce the surface tension of the repellant layer which in turn permits the degradable substrate to be more readily attacked by an assaulting liquid and thereby degraded. For example, the fluorochemical repellant discussed above, generally does not permit the substrate to be wet by an assaulting liquid until the fluorochemical repellant is contacted with the fluorosurfactant. Therefore, a surfactant may be used to control when the substrate is exposed to a degrading or assaulting liquid.

In degradation the degradable substrate portion of the article is converted by hydrolysis and/or bacterial activity, possibly accompanied with photo and chemical activity, into environmentally benign products (e.g., photo-oxidation, high temperature aqueous alkali treatment, etc.). The repellant surface material, normally present in a low percentage, along with any inert fillers and the like, may remain generally unaffected after the substrate is substantially completely degraded. If the repellant coated degradable substrate is laminated onto a paper or other non-woven cellulosic fiber backing, the substrate can be degraded by hydrolysis (e.g., aided by a wetting agent or surfactant), and the paper may be repulped.

A desirable substrate composition of the present invention comprises at least one member selected from the group of polylactic acid, polyglycolic acid, polylactic/glycolic acid copolymers, copolymers of these with minor amounts of other degradable monomers, etc. The degradable substrate may include other ingredients, such as plasticizing amounts of degradable monomers, oligomers, low molecular weight polymers, etc. Generally, any material may be included in the substrate which does not adversely effect degradability and/or the desired end-use of the article. For example, filler materials may be included in the substrate to, 1) inhibit photodegradability and/or 2) color or print the product. The filler materials may be included substantially throughout or on at least a portion of the surface of the degradable substrate. Suitable filler materials comprise one or more of calcium carbonate, clays, $TiO_2$ dyes, fluorescent agents, photostabilizers, printing inks, etc.

The shaped articles of the present invention can be in many forms. They can be individual articles such as food handling, storing and serving containers and utensils, particularly if coated on both surfaces with a repellant layer. Also the shaped articles of the invention can be in a continuous form such as repellant coated films, gauze, filaments, strapping, etc.

If desired, the articles of the invention can be laminated onto other materials or structures. In one aspect of the invention, the outer layer of repellant prevents the degradable substrate material, such as polylactic acid, from coming in direct contact with and sticking to the pressure rolls, plates and other hot surfaces which are typically used during a lamination process. As examples of laminated structures, a degradable substrate having a repellant coating may be used as a coating or layer for articles such as a paper or hot food container (e.g., cup, tray, etc.), or frozen food or microwave container, etc.

Moreover, the repellant coated substrate of the invention may comprise a film provided on one or more surfaces of a paper structure. Also this repellant film can be used in conjunction with a photodegradable polyethylene, polypropylene, etc. Thus, completely degradable fast food containers can be made using a paper based laminates. For example, a laminated article may be fabricated by concurrently passing adjacent layers (e.g., concurrently extruded films or layers), of a cellulosic material and at least one film having the characteristics described above, through a bath of a liquified material comprising the repellant surface material in a manner sufficient to coat the external surfaces of the adjacent layers. The cellulosic material may be located between two films and/or laminated on at least one side by one or more films. The laminate may then be heated to dry the liquified repellant material and bond together the cellulosic, film and repellant layers to form a laminate.

Certain aspects of the present invention are demonstrated further by the following Examples which are provided to illustrate and not limit the contemplated range of equivalents.

In the following Examples, unless specified otherwise commercially available materials were used to perform these Examples.

EXAMPLE 1

About 95% L polylactide/5% D,L polylactide (PLA) powder was mixed with 25 weight percent (of the mixture) of calcium carbonate filler powder. This powder was s mixed with methylene chloride to make about an 8.8% wt. polylactide solution. This mixture was agitated in a Cowles mixer at fast speed for about 15 minutes to obtain a uniform mixture. The uniform mixture was then solution cast to form a film about 10 mils in thickness.

This film was then laminated to the surface of a recyclable paperboard (comprising about 20 wt % corrugated board, 80 wt % newprint, that was about 0.05 inches thick) by softening the film using an air heater having a discharge temperature of about 180° C.

The resultant laminate had the white appearance of the calcium carbonate filled polylactide. After exposure to Northern sunlight through a window, at 73° F. and 50% relative humidity for six months, the laminate did not undergo a noticeable degradation or other change.

A droplet of about 10 wt % sulfuric acid was placed on the polymeric film surface of the laminate. There is an immediate release of gas (carbon dioxide from the calcium carbonate), indicating rapid degradation of the PLA layer.

Part of another area of the external surface of the film/paper laminate was coated with a 1 wt % emulsion fluorochemical and/or water repellant which is available commercially as "Zonyl" 7040 (formerly "Zepel" 7040). "Zonyl" 7040 is manufactured by E.I. du Pont de Nemours and Company. The "Zonyl" 7040 dired to a discontinuous layer of discrete particles, leaving about 10% of the coated substrate exposed (i.e., without a coating). The particles of "Zepel" 7040 have a low critical surface tension of about 5 dynes/cm.

Water sprinkled on the area of "Zonyl" 7040 did not wet the film, but rather was repelled and formed into spherical droplets. A droplet of about 10 wt % sulfuric acid was also repelled and did not react with the calcium carbonate or otherwise affect the film. The "Zonyl" 7040 treated area the film surface of the laminate also repelled other hydrophilic substances and oleophilic substances including AATCC No. 8 oil.

A section of this film/paper laminate, containing an area not treated with "Zonyl" 7040 and an area treated therewith, was exposed to composting biodegradability conditions by burying in wet soil. Visual observation after about 3 months revealed degradation had occurred on both sides of the film, and after 6 months the laminate exhibited substantially complete degradation of the paper and the polylactic acid film layers. The section of the film that had been treated with "Zonyl" 7040 left behind an environmentally insignificant and barely visible amount of non-degraded fluoropolymer grains.

EXAMPLE 2

A polylactic acid film including a calcium carbonate filler was prepared substantially in accordance with Example 1. The film was placed on one side of a degradable paperboard formed from solid bleached sulfite used typically for fast food serving containers, and then coated on the film's external surface with about a 1 wt % emulsion of "Zonyl" 7040. The composite structure was heat set by contact with heating plates for about 30 seconds at about 138° C. to soften the polylactic acid film and bond it to the degradable paperboard while drying the "Zonyl" 7040 on the external surface of the polylactic acid film. There was an excellent release of the coated polylactic acid film surface from the hot plate surface. This coating/heating procedure was repeated for the uncoated other side of the paperboard; thereby laminating a repellant coating film onto both sides of the degradable paperboard. The laminate was then shaped into serving containers including paper plates and salad boxes. In use the products were stable, and repelled aqueous materials, oil and greasy food residues. These containers were totally degradable in a composite waste landfill, except for undegradable grains of fluorochemical repellant ("Zonyl" 7040).

EXAMPLE 3

Figure 3:
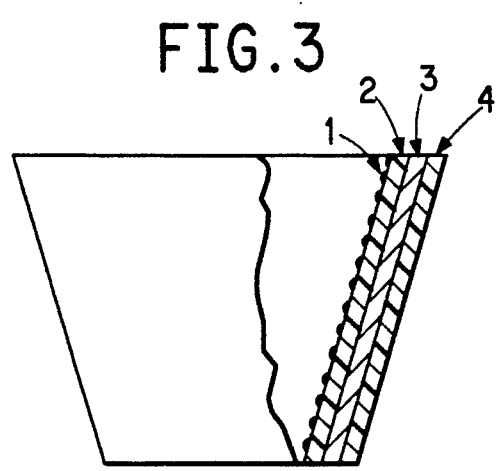
FIG. 3 is a diagram of a cold-liquid cup formed according to Example 3.

A laminated degradable paper cup is prepared according to the following method. The polylactic acid (PLA) polymer formed substantially in accordance with Example 1 is melt extruded to about a 1 mil thickness film. The film is laminated to both sides of a degradable paperboard, about 33 mil thick. This laminate is then coated by a doctor knife on one side with an approximately 1 wt % emulsion of "Zonyl" 7040 repellant and dried continuously against a heated plate surface. The laminate is shaped by hand into a cup; wherein "Zonyl" 7040 comprises the interior surface layer of the paper cups. The 4-layer laminate is then formed into cups suitable for cold water and soft drinks which is illustrated in FIG. 3. Now referring to FIG. 3, 1 is the repellant layer, 2 is the PLA film; 3 is the paper layer; and 4 is the PLA film.

EXAMPLE 4

Figure 4:
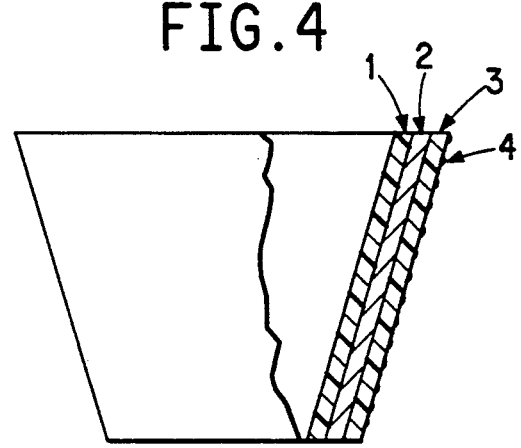
FIG. 4 is a diagram of a hot-liquid cup formed according to Example 4.

To prepare coffee and hot drink degradable containers, the polylactic acid polymer of Example 1 is melt-extruded to an approximately 0.75 mil thick film. The film was then coated with an about 1 wt % emulsion of "Zonyl" 7040 repellant on one surface of the film. The untreated side of the polylactic acid film is heat bonded to an about 33 mil thick degradable paperboard surface using heated plates. The dried repellant layer formed the exterior of the cup. A 1 mil thick photodegradable polyethylene film is laminated to the opposite side of the paperboard which formed the interior of the cup. This 4-layer laminate is formed into cups that can withstand the hot liquid and steam of hot drinks which is illustrated in FIG. 4. Now referring to FIG. 4, 1 is photodegradable polyethylene, 2 is the paper layer, 3 is the PLA film, and; 4 is the repellant layer. These cups are substantially completely degradable in a composite landfill except for the non-degradable grains of fluorochemicals and polyethylene powder.

EXAMPLE 5

Figure 5:
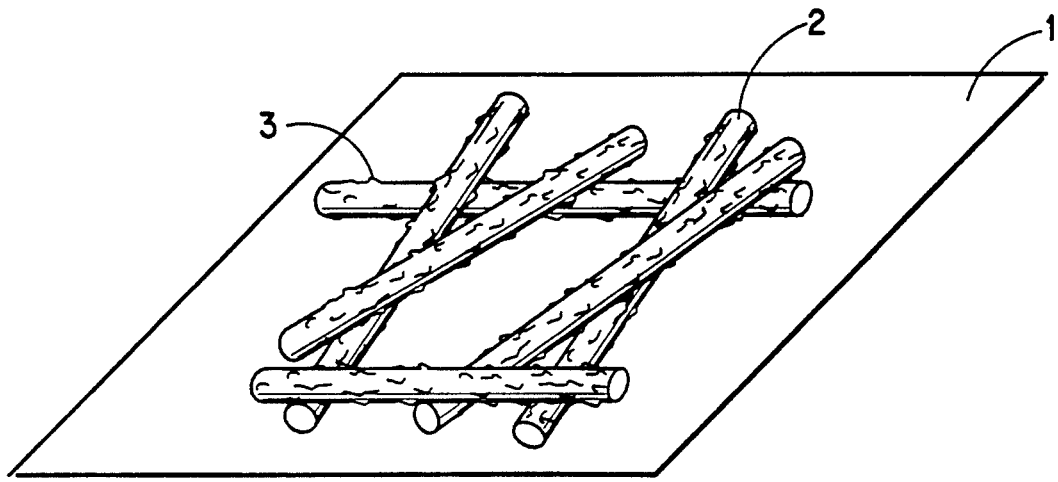
FIG. 5 is a diagram of a laminate formed according to Example 5.

A woven structure of individual 10 micron polyglycolic acid (PGA) filaments with an approximate maximum generally square pore opening of about 100 microns on each side was coated with an approximately 1% solution of "Teflon" MF. The approximate open area in the fabric is 8%. The coated non-woven fabric was placed on an extruded 1 mil thick polylactic acid base film, and these are heated together at about 130° C. for about 15 seconds over a heating plate. The resultant composite had a discontinuous repellant layer coated on a polyglycolic acid filament substrate surface, which was bonded to a degradable polylactic acid film that is illustrated in FIG. 5. Now referring to FIG. 5, 1 is the PLA film base layer, 2 is the PLA filament substrate layer, and; 3 is the discontinuous repellant layer. Water is substantially completely repelled by the repellant layer from both the polyglycolic acid filament substrate layer and the PLA base film.

Although a few exemplary embodiments of the present invention have been described above in detail, those skilled in this art will readily appreciate that this invention embraces many combinations and variations other than those exemplified.

What is claimed:
1. An article comprising:
    (a) a substrate comprising a poly(hydroxy acid) selected from the group consisting of (1) poly(lactic acid), (2) poly(glycolic acid), (3) copolymers of lactic acid and glycolic acid, and (4) copolymers of lactic acid with a monomer selected from the group consisting of epsilon-caprolactone, beta-propiolactone, alpha,alpha-dimethyl-beta-propiolactone, and dodecanolactone; the substrate comprising at least one surface;
    (b) a surface layer of a repellant material on at least one surface of the substrate, wherein the surface layer is:
        (1) capable of preventing aqueous media from wetting the substrate;
        (2) substantially discontinuous, giving coated and uncoated substrate areas, the coated areas comprising at least 80% of the substrate surface bearing the surface layer; and
        (3) sufficiently discontinuous to permit biodegradation of the substrate or penetration of water vapor into the substrate;
    wherein the repellant material has a critical surface tension of 5 to 54 dynes/cm.
2. The article of claim 1 wherein the repellant surface layer comprises discrete particles of repellant material.
3. The article of claim 1 wherein the repellant surface layer comprises a porous sheet.
4. The article of claim 1 wherein the surface layer comprises a material that is both hydrophobic and oleophobic.

5. The article of claim 1 the repellant material has a critical surface tension of 5 to 30 dynes/cm.

6. The article of claim 1 the repellant material has a critical surface tension of 5 to 13 dynes/cm.

7. The article of claim 1, 5 or 6, additionally comprising a cellulosic fiber layer; the article comprising, in order: surface layer, substrate, and cellulosic fiber layer.

8. The article of claim 7 wherein the substrate consists essentially of a polymer selected from the group consisting f poly(lactic acid), poly(glycolic acid), and copolymers of lactic acid and glycolic acid.

9. The article of claim 7 wherein the cellulosic fiber layer is paper.

10. The article of claim 1, 5, or 6, additionally comprising a cellulosic fiber layer, an additional substrate, and an additional surface layer; the article comprising, in order: surface layer, substrate, cellulosic fiber layer, additional substrate, and additional surface layer.

11. The article of claim 10 wherein the substrate consists essentially of a polymer selected from the group consisting of poly(lactic acid), poly(glycolic acid), and copolymers of lactic acid and glycolic acid.

12. The article of claim 10 wherein the cellulosic fiber layer is paper.

13. The article of claim 6 wherein the surface layer comprises a perfluoroalkyl polymer.

14. The article of claim 6 wherein the surface layer comprises a perfluoroalkylethylacrylate polymer.

15. The article of claim 6 wherein the surface layer comprises a polymer derived from a mixture of perfluoroalkylethylacrylate monomers of the formula:

$$CF_3CF_2(CF_2CF_2)_kC_2H_4OC(O)CH=CH_2,$$

the monomer mixture consisting essentially of:
(1) 0–10% monomer wherein k is less than 4;
(2) 45–75% monomer wherein k is 6;
(3) 20–40% monomer wherein k is 8;
(4) 1–20% monomer wherein k is 10; and
(5) 0–5% monomer wherein k is 12;
(b) 10–35% polymer chain units derived from an vinylidene chloride; and
(c) 10–25% polymer chain units derived from an alkyl acrylate or an alkyl methacrylate having an alkyl chain length of 2–12 carbon atoms.

16. The article of claim 1, claim 5, or claim 6 wherein the substrate consists essentially of a polymer selected from the group consisting of poly(lactic acid), poly(glycolic acid), and copolymers of lactic acid and glycolic acid.

17. The article of any of claim 1, claim 5, or claim 6 wherein coated area comprises 80–95% of the substrate surface bearing the surface layer.

18. The article of claim 1 wherein the surface layer comprises a woven structure coated with a repellant comprising an organopolysiloxane.

19. The article of claim 9 wherein the article is a food container.

* * * * *